US010293509B2

(12) United States Patent
Barezzani et al.

(10) Patent No.: US 10,293,509 B2
(45) Date of Patent: May 21, 2019

(54) CUTTING OR COMPRESSION TOOL

(71) Applicant: Cembre S.p.A., Brescia (IT)

(72) Inventors: Gualtiero Barezzani, Brescia (IT); Michele Orizio, Brescia (IT)

(73) Assignee: Cembre S.p.A., Brescia (IT)

( * ) Notice: Subject to any disclaimer, the term of this patent is extended or adjusted under 35 U.S.C. 154(b) by 17 days.

(21) Appl. No.: 15/373,770

(22) Filed: Dec. 9, 2016

(65) Prior Publication Data
US 2017/0165856 A1 Jun. 15, 2017

(30) Foreign Application Priority Data
Dec. 10, 2015 (IT) .......................... 102015000081827

(51) Int. Cl.
B26D 5/12 (2006.01)
H02G 1/00 (2006.01)
B26B 27/00 (2006.01)
B26D 5/08 (2006.01)

(52) U.S. Cl.
CPC ................ B26D 5/12 (2013.01); B26B 27/00 (2013.01); B26D 5/086 (2013.01); H02G 1/005 (2013.01)

(58) Field of Classification Search
CPC .......... B26D 5/12; B26D 5/086; B26B 27/00; B26B 15/00; B23D 23/00; B23D 15/04; B23D 29/00
USPC ............................................ 30/228, 92, 266
See application file for complete search history.

(56) References Cited

U.S. PATENT DOCUMENTS

| 728,068 | A | * | 5/1903 | Young | B26B 15/00 30/228 |
| 3,255,525 | A | * | 6/1966 | Frenzel | B26B 17/02 30/180 |
| 4,369,576 | A | * | 1/1983 | McVaugh | B23D 29/002 30/228 |
| 4,506,445 | A | * | 3/1985 | Esten | B23D 29/002 30/228 |
| 4,611,511 | A | * | 9/1986 | Mykkanen | H02G 1/1224 30/90.6 |
| 5,058,272 | A | * | 10/1991 | Steube | B23D 17/06 30/134 |
| 5,533,682 | A | | 7/1996 | de Gier et al. | |
| 2007/0055164 | A1 | * | 3/2007 | Huang | A61B 5/0205 600/508 |
| 2010/0032973 | A1 | | 2/2010 | Ramun | |
| 2013/0320122 | A1 | | 12/2013 | Ko | |

FOREIGN PATENT DOCUMENTS

| EP | 0 435 702 A1 | 7/1991 |
| GB | 1 224 225 | 3/1971 |

* cited by examiner

Primary Examiner — Kenneth E Peterson
Assistant Examiner — Nhat Chieu Q Do
(74) Attorney, Agent, or Firm — Blank Rome LLP

(57) ABSTRACT

A cutting or compression tool comprises a housing and a driving group for moving a driving piston with respect to the housing, a fixed jaw with a first connecting seat and a second connecting seat for a stationary connection to the housing, a mobile jaw with a first fulcrum seat hinged to the fixed jaw at the second connecting seat and a second fulcrum seat hinged to a first connecting plate connected to the driving piston. The distance between the first connecting seat and the second connecting seat of the fixed jaw is equal to the distance between the first fulcrum seat and the second fulcrum seat of the mobile jaw.

8 Claims, 4 Drawing Sheets

CUTTING OR COMPRESSION TOOL

BACKGROUND OF THE INVENTION

1. Field of the Invention

The present invention relates to a cutting and/or compression tool, in particular a hydrodynamic cutting tool.

2. Description of the Related Art

Hydrodynamic cutting and/or compression tools are often used to perform specific cutting operations, for example cutting electric cables during the installation and maintenance of electrical systems, or connection operations, for example the compression of connectors about electric cables or for water pipes, the compression of rivets.

Such tools usually comprise an electric motor supplied by an accumulator and a hydraulic pump which causes an increase in pressure of a hydraulic liquid acting on a piston to move the piston against the force of a pressure spring. The piston in turn is connected to a mobile jaw so as to move it towards a fixed jaw of the tool during the compression operation. The jaws may be shaped and/or provided with interchangeable accessory elements so as to be adapted to a particular object, for example a metal bar to be cut or an electric contact to be compressed.

In an example of cutting jaws of the related art developed by applicant (shown in FIGS. 1 to 5), a fixed jaw of increased dimensions is rigidly connected to the frame of the tool through bolting in a first and a second connection point, which are spaced from each other, to transmit both the direct forces and the bending moments to the housing, while a mobile jaw of smaller dimensions than those of the fixed jaw is pivotally hinged to the fixed jaw in a third fulcrum point spaced both from the first connection point and from the second connection point, and is connected to the piston through a connecting plate pivoted to the second jaw in a fourth connection point spaced from the third fulcrum point.

Such a configuration results in increased bending stresses of the fixed jaw during the use of the tool.

Since the portions of the sharp blade-like cutting jaws or portions shaped like compression surfaces are subjected to increased local stresses and stress concentrations, both jaws are usually made of steel hardened through heat treatment which not only increases the cost of the material, but also the susceptibility to brittle fracture and fatigue failure, in particular of the fixed jaw.

This involves increased maintenance costs due to the need to acquire, keep stock, and replace mobile jaws and fixed jaws, with the further burden that precisely the fixed jaw—which is the largest and most costly—breaks more frequently due to bending stresses.

SUMMARY OF THE INVENTION

It is therefore the object of the present invention to improve the cutting and/or compression tools of the related art described above so as to obviate the drawbacks mentioned with reference to the related art.

Particular objects of the invention are those of providing a cutting and/or compression tool which reduces the bending stresses on the fixed jaw, reduces the dimensions of the fixed jaw with respect to the mobile jaw and reduces the manufacturing and storing cost of the jaws of the tool.

These and other objects are achieved by means of a cutting or compression tool, comprising:

a housing and a driving group supported in the housing and configured to move a driving piston with respect to the housing, a fixed jaw which forms a first connecting seat for a first connection at a first connection point and a second connecting seat for a second connection at a second connection point, in which the second connecting seat is spaced from the first connecting seat and the fixed jaw is connected in a stationary manner with respect to the housing through said first and second connecting seats, a mobile jaw which forms a first fulcrum seat for a first hinged connection and a second fulcrum seat for a second hinged connection, in which the second fulcrum seat is spaced from the first fulcrum seat and the mobile jaw is hinged to the fixed jaw through the first fulcrum seat at a first fulcrum point, a first connecting plate having a first end hinged to the driving piston and a second end hinged to the mobile jaw through the second fulcrum seat at a second fulcrum point, in which, in response to the movement of the driving piston with respect to the housing, the mobile and fixed jaws perform a relative rotational movement about the first fulcrum point, between an open position and a closed position in order to perform the cutting or the compression, in which the second connection point of the fixed jaw coincides with the first fulcrum point between the mobile jaw and the fixed jaw, and the distance between the first and second connecting seats of the fixed jaw is equal to the distance between the first and second fulcrum seats of the mobile jaw.

Thereby, the fixed jaw may be manufactured with the same reduced dimensions or even with the same shape and structure as the mobile jaw, and the "inner" lever arm may be reduced, and thus the bending stresses of the fixed jaw. This reduces the amount of material and the cost for manufacturing the fixed jaw and extends the life thereof. Moreover, if both the fixed and mobile jaws are manufactured with the same shape and structure, one jaw alone may be kept in the warehouse in reduced amounts (considering that, statistically, both jaws do not break at the same time), and it may be used to replace both the fixed and mobile jaws.

Moreover, the high bending stresses, which in the known art are present in the fixed jaw, are now moved to the housing which is not directly involved in the cutting or compression action and which therefore may be made of a less hard and tougher material, for example of a non-hardened steel.

According to one aspect of the invention, the tool comprises a second connecting plate having a first end pivoted to the housing at a third connection point and a second end pivoted to the fixed jaw through one of the first and second connecting seats, and the fixed jaw is further directly connected to the housing through the other of the first and second connecting seats so that the housing, the second connecting plate and the fixed jaw form an articulated non-deformable triangle.

Due to this particular configuration, the stresses of the cutting or compression operation are transmitted between the fixed jaw to the housing in the form of axial forces in the direction of the axes which connect the first, second and third connection points, thus further reducing the bending stresses of the fixed jaw.

BRIEF DESCRIPTION OF THE DRAWINGS

To better understand the invention and appreciate its advantages, certain non-limiting embodiments thereof are described below, while referring to the accompanying drawings, in which.

DETAILED DESCRIPTION OF THE PREFERRED EMBODIMENTS

Figure 1:
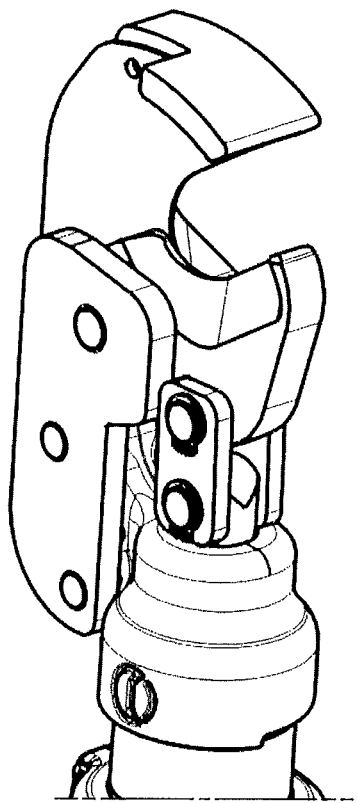
FIGS. 1 and 2 show a cutting head of a cutting tool of the related art.
Figure 2:
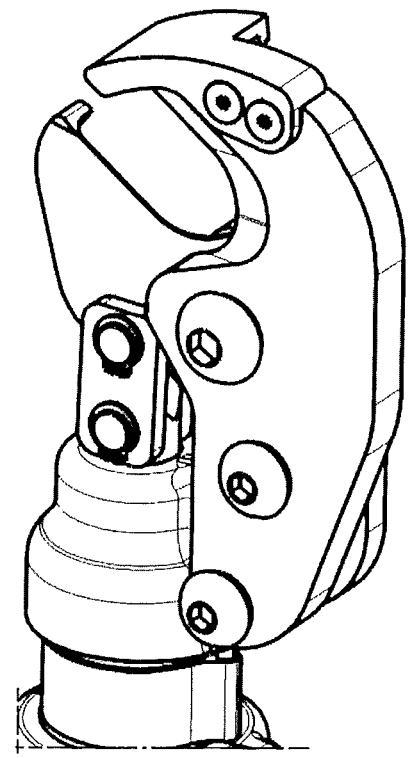
Figure 3:
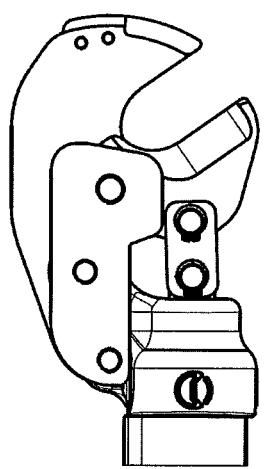
FIGS. 3, 4 and 5 show a cutting movement sequence of the cutting head in FIGS. 1 and 2.
Figure 4:
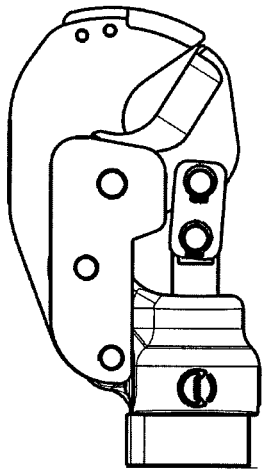
Figure 5:
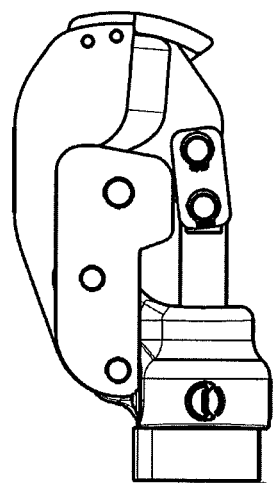
Figures 6, 7:
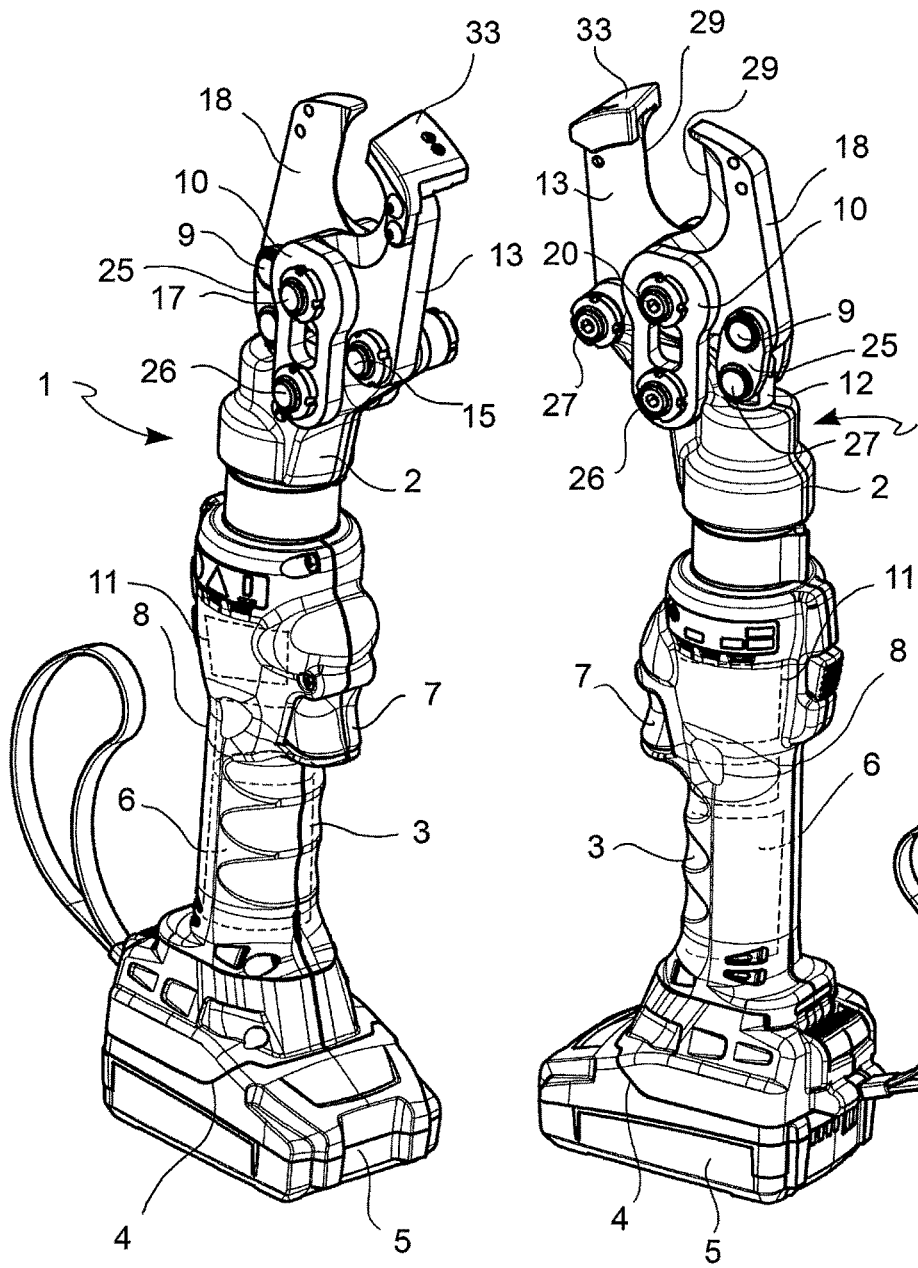
FIGS. 6 and 7 show a cutting tool (which may also act as a compression tool) according to one embodiment.
Figures 8, 9, 10:
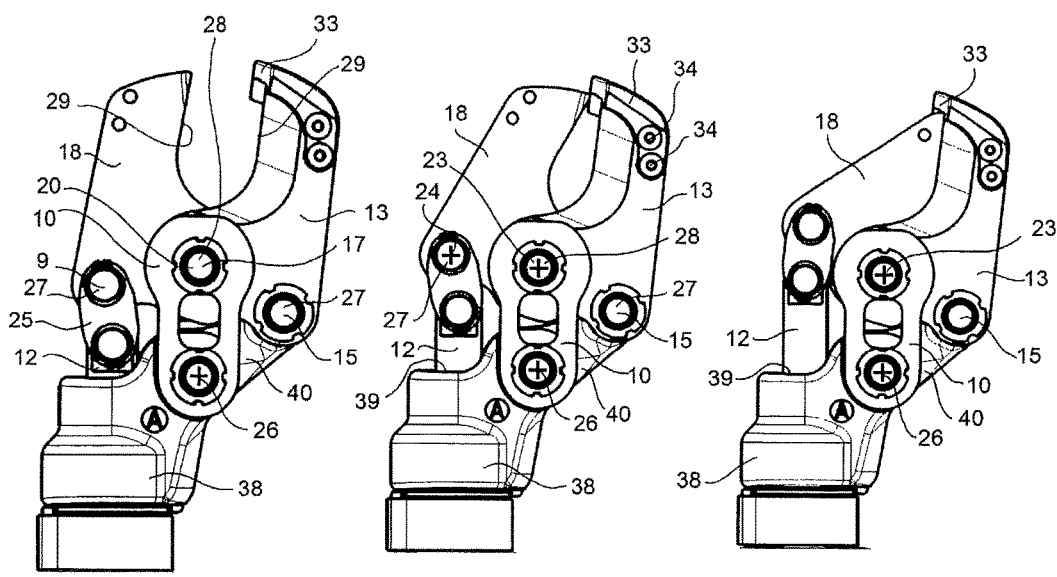
FIGS. 8, 9 and 10 show a cutting movement sequence of a cutting head of a tool according to one embodiment.

With reference to the figures, a hydrodynamic compression and/or cutting tool in accordance with the invention is indicated as a whole with numeral 1. Tool 1 comprises a housing 2 and a drive with an electric motor 6 which can be supplied by an accumulator 5 or grid, and a fluid-dynamic assembly 11 which can be actuated through the electric motor 6 and is configured, in response to the movement of motor 6, to increase the pressure of a hydraulic liquid acting on a driving piston 12 so as to move the driving piston 12 with respect to housing 2.

Particularly, housing 2 comprises a grip-shaped portion 3 and a coupling portion 4 for connecting, preferably a snap-fit, a replaceable and rechargeable electric accumulator 5. Housing 2 houses an electric motor 6 which can be supplied by accumulator 5 through a supply and control circuit provided with a switch on which a manual actuation button 7 arranged adjacent to grip 3 acts.

A transformation mechanism 8 is arranged in housing 2 and is connected to the drive shaft of motor 6 so as to transform the rotational motion of the drive shaft into a cyclical or reciprocating motion, for example translational. A hydraulic pump 11, also housed in housing 2, is connected to the transformation mechanism 8 and, in response to the cyclical or reciprocating movement of the transformation mechanism 8, is adapted to increase the pressure of a pressure fluid acting on a driving piston 12 so as to move the driving piston 12 along a piston stroke.

The invention is not limited to this specific embodiment of the supply and actuation of tool 1. The supply may be an electric network supply or a compressed air supply or other known energy supply. Similarly, the driving group may be electrical, electrical-hydraulic, pneumatic, fluid-dynamic or mechanical or of other known type.

Tool 1 further comprises a fixed jaw 13 arranged at a front end of the tool and which forms a first connecting seat 14 for a first connection at a first connection point 15 and a second connecting seat 16 for a second connection at a second connection point 17, in which the second connecting seat 16 is spaced from the first connecting seat 14 and the fixed jaw 13 is connected in a stationary manner with respect to housing 2 through said first connecting seat 14 and second connecting seat 16.

Tool 1 further comprises a mobile jaw 18 which forms a first fulcrum seat 19 for a first hinged connection 20 and a second fulcrum seat 21 for a second hinged connection 9, in which the second fulcrum seat 21 is spaced from the first fulcrum seat 19 and the mobile jaw 18 is hinged to the fixed jaw 13 through the first fulcrum seat 19 at a first fulcrum point 23.

Tool 1 further comprises a first connecting plate 25 having a first end hinged to the driving piston 12 and a second end hinged to the mobile jaw 18 through the second fulcrum seat 21 at a second fulcrum point 24.

In response to the movement of the driving piston 12 with respect to housing 2, the mobile jaw 18 and fixed jaw 13 perform a relative rotational movement about the first fulcrum point 23, between an open position and a closed position in order to perform the cutting or the compression.

According to one aspect of the invention, the second connection point 17 of the fixed jaw 13 coincides with the first fulcrum point 23 between the mobile jaw 18 and the fixed jaw 13, and the distance between the first 14 and second connecting seat 16 (and similarly, between the first and second connection points 15, 17) of the fixed jaw 13 is equal to the distance between the first fulcrum seat 19 and second fulcrum seat 21 (and similarly, between the first and second fulcrum points 23, 24) of the mobile jaw 18.

Thereby, the fixed jaw 13 may be manufactured with the same reduced dimensions or even with the identical shape and structure as the mobile jaw 18, and the "inner" lever arm may be reduced, and thus the bending stresses of the fixed jaw 13. This reduces the amount of material and the cost for manufacturing the fixed jaw 13 and extends the life thereof.

Moreover, if both the fixed 13 and the mobile 18 jaws are manufactured with the same shape and structure, one jaw alone may be kept in the warehouse in reduced amounts (considering that, statistically, both jaws 13, 18 almost never break at the same time), and it may be used to replace both the fixed and mobile jaws.

Moreover, the high bending stresses, which in the known art are present in the fixed jaw, are now moved to housing 2 which is not directly involved in the cutting or compression action and which therefore may be made of a less hard and tougher material, for example of a non-thermoset steel.

According to a further aspect of the invention, tool 1 comprises a second connecting plate 10 having a first end connected to housing 2 at a third connection point 26 and a second end connected to the fixed jaw 13 through one of the first 14 and second 16 connecting seats (in one of the first 15 and second 17 connection points), and the fixed jaw 13 is further directly connected to housing 2 through the other of the first 14 and second connecting seats 16 (in the other one of the first 15 and second 17 connection points), so that housing 2, the second connecting plate 10 and the fixed jaw form an articulated or hinged non-deformable triangle.

Due to this particular configuration, the stresses of the cutting or compression operation are transmitted between the fixed jaw 13 and housing 2 in the form of axial forces in the direction of the axes which connect the first 15, second 17 and third connection points 26, thus further reducing the bending stresses of the fixed jaw 13.

Advantageously, the second end of the second connecting plate 10 is connected to the fixed jaw 13 through the second connecting seat 16 at the first fulcrum point 23, and the fixed jaw 13 is directly connected to housing 2 through the first connecting seat 14.

This configuration allows the second connecting plate 10 to be easily positioned in a central or intermediate position between the first connecting plate 25 and the first connection point 15, and therefore to keep compact and further reduce the overall dimensions of the fixed jaw 13.

In one embodiment (FIGS. 6 to 10), the first 20 and second 9 hinged connections of the mobile jaw 18 and, when provided, the hinged connections of the first 25 and second 10 connecting plates define hinge axes which are parallel to each other and are parallel to the relative rotation axis (the axis of the fulcrum point 23) between the fixed jaw 13 and the mobile jaw 18.

The fixed 13 and mobile 18 jaws each have a plate-like shape (intended to be) oriented in a plane perpendicular to the relative rotation axis (the axis of the fulcrum point 23) between the fixed jaw 13 and the mobile jaw 18.

The connecting seats 14, 16 as well as the fulcrum seats 19, 21 are circular holes adapted to receive corresponding connecting pins or bolts 27 or fulcrum pins or bolts 28 in order to provide the aforesaid pivoted and hinged connections. The three pins forming the articulated indeformable triangle may be made of non-thermoset material because they are not subjected to friction. The two pins of the first connecting plate 25 are preferably made of thermos-hardened and friction-resistant material.

Both the fixed 13 and mobile 18 jaws have an integrally-formed jaw body which has a substantially L-shape with:

a sharp blade-like portion or portion 29 profiled as a compression surface, formed along an edge of an upper arm 30 of the "L", and a first hole formed in a lower base 31 of the "L" close to a free end 32 thereof which faces the same side of the blade-like portion 29 or the compression surface, and a second hole formed in the lower base of the "L" at the joining angle between the upper arm 30 and the lower base 31, opposite the free end 31, in which the first hole forms the second connecting seat 16 (in the case of the fixed jaw 13) and/or said first fulcrum seat 19 (in the case of the mobile jaw 18) and said second hole forms said first connecting seat 14 (in the case of the fixed jaw 13) and/or said second fulcrum seat 21 (in the case of the mobile jaw 18).

Preferably, the diameter of the first hole 16, 19 (and of the corresponding pin or bolt) is greater than the diameter of the second hole 14, 21 (and of the corresponding pin or bolt) in order to better guide the relative rotational movement of the jaws 13, 18 and to sustain the shear stresses in reaction to the cutting or compression action.

In one embodiment, there is inserted, in the first holes 16, 19 (i.e. in the second connecting seat 16 and in the first fulcrum seat 19), a cylindrical spacer 41, which has a calibrated length greater than the sum of the thicknesses of the second connecting seat 16 and the first fulcrum seat 19, so as to accurately define a space between two opposite plates of the second connecting plate 10 abutting against the two opposite ends of the cylindrical spacer 41, to allow a relative rotational sliding between the fixed and the mobile jaws 13, 18.

Alternatively, the cylindrical spacer 41 may have a calibrated length greater than the sum of the thicknesses of the second connecting seat 16, the first fulcrum seat 19 and the plates forming the second connecting plate 10, so as to accurately define a space between a pin head and bolt or between two bolts screwed onto pin 28 and abutting against the two opposite ends of the cylindrical spacer 41, to allow a relative rotational sliding between the fixed and the mobile jaws 13, 18.

Tool 1 further comprises a guiding portion 33 made separately from the fixed 13 and mobile 18 jaws and then connected, for example by means of screws 34, to the fixed jaw 13 on one side of the sharp blade-like portion 29 or of the compression surface opposite to the first fulcrum point 23, and configured to engage a free edge 35 of the mobile jaw 18 and to avoid a spreading of the jaws 13, 18 in a direction transverse to the cutting plane during the mutual approximation thereof towards the closed position.

In order to use the same piece both as a fixed jaw 13 and as a mobile jaw 18 without renouncing the guiding portion 33, both the jaws 13, 18 form one or more fixing holes 36 on one side of the sharp blade-like portion 29 or of the compression surface opposite to the first fulcrum point 23, to allow to mount the guiding portion 33.

Figure 11:
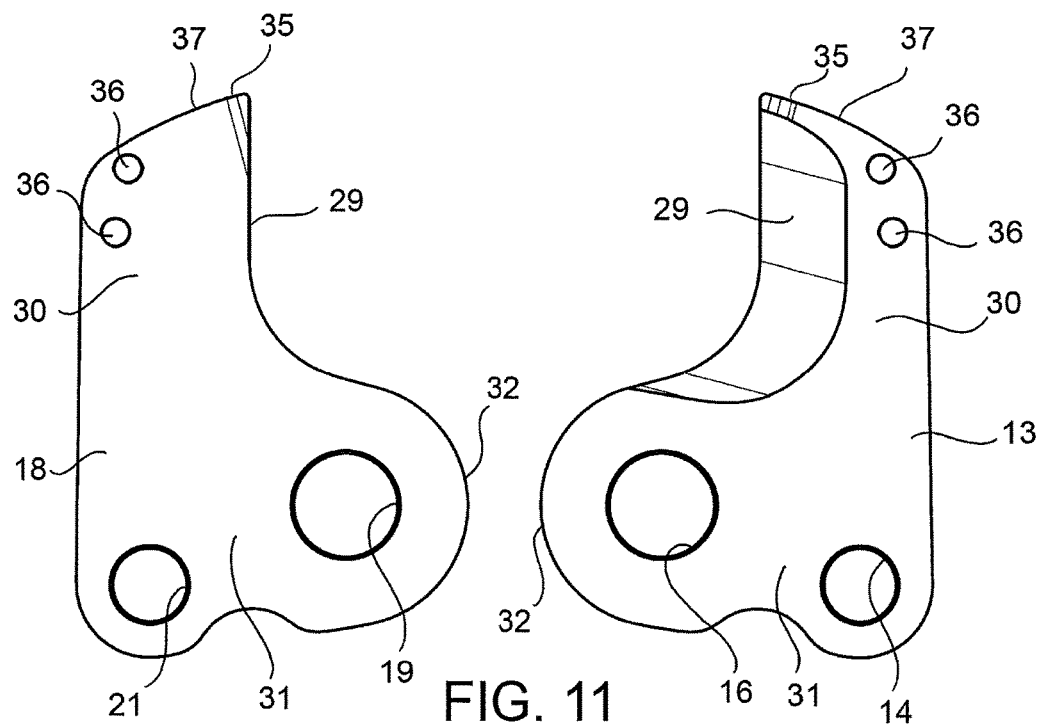
FIG. 11 shows a mobile jaw and a fixed jaw having the same shape and structure for/of a cutting tool according to one embodiment.
Figure 12:
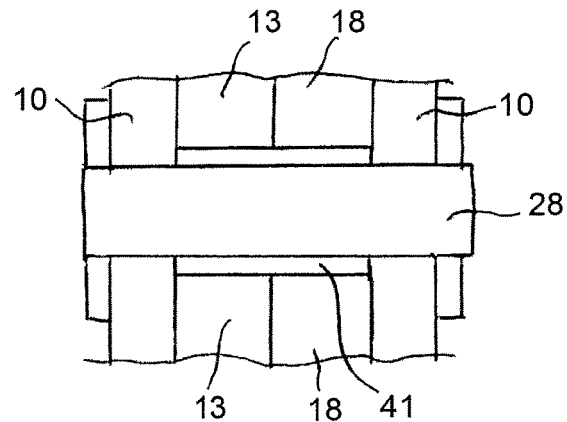
FIGS. 12 and 13 show two embodiments of a rotation fulcrum of a cutting tool according to one embodiment.
Figure 13:
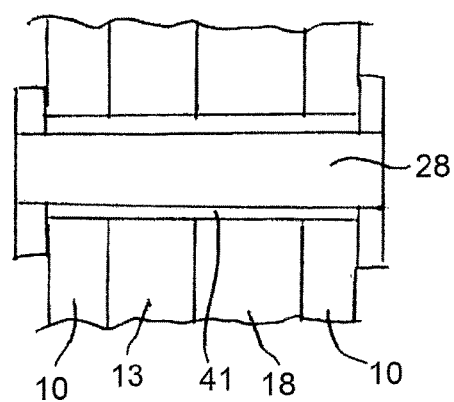

In the embodiment shown in FIG. 11, the fixing holes 36 are formed close to a free end 37 of the upper arm 30 of the "L"-shaped jaw body.

Advantageously, housing 2 forms a connection base 38 [preferably made of ductile and tough steel, for example 39NiCrMo3 (quenching steel) for the connection of the fixed 13 and mobile jaws 18. The connection base 38 forms a passage opening 39 through which an end of the driving piston 12 extends, and a lateral arm 40 protruding from an edge of the passage opening 39, away from the driving piston 12 and forming a first hole for the pivoted connection of the first end of the second connecting plate 10 and a second hole for the direct pivoted connection with the fixed jaw 13.

The jaws 13, 18 are advantageously made of thermo-treated steel, for example X155CrVMo121KU (steel for tools).

The first and second connecting plates 25, 10 each comprise a pair of two plates arranged and hinged on both sides of the mobile 18 and/or fixed 13 jaw in order to reduce additional stresses due to transmission eccentricities of the cutting and/or compression forces.

In the zone of the second connecting seat 16, both the plates of the second connecting plate 10 are widened transversely to the longitudinal axis of the connecting plate in a plane which is perpendicular to the fulcrum axis 23, thus forming two opposite and parallel walls which guide the relative rotational movement of the jaws 13, 18 in their cutting plane, thus avoiding bending motions, movements and unplanned stresses.

The fixed 13 and mobile 18 jaws are removably mounted to tool 1 in a replaceable manner, preferably the jaw bodies of the fixed 13 and mobile 18 jaws are interchangeable and in any case can be mounted to tool 1 and used (even in the presence of mutual shape differences), even more preferably the jaw body of the fixed jaw 13 has the identical shape, dimension and structure as those of the jaw body of the mobile jaw 18.

The invention is advantageously applicable both to cutting and/or compression portable devices with single housing, in particular "hand held" tools, and to cutting and/or compression devices in which the hydraulic pump may be separated and spaced from the cutting and/or compression head (driving piston 12, jaws) and connectable thereto through a flexible hose for pressurized oil.

Obviously, those skilled in the art aiming at meeting contingent and specific needs can make further changes and variants to the cutting and/or compression tool according to the present invention, which are all contained within the scope of protection of the invention defined by the following claims.

The invention claimed is:

1. Cutting or compression tool, comprising:
   a housing and a driving group connected to the housing and configured to move a driving piston with respect to the housing,
   a fixed jaw comprising a first connecting seat and a second connecting seat, wherein the second connecting seat is spaced from the first connecting seat and the fixed jaw is non-pivotably connected with respect to the housing through said first and second connecting seats, a mobile jaw identical to the fixed jaw, the mobile jaw comprising a first fulcrum seat and a second fulcrum seat, wherein the second fulcrum seat is spaced from the first fulcrum seat, and the mobile jaw is hinged to the fixed jaw through a pivotable connection between the first fulcrum seat of the mobile jaw and the second connection seat of the fixed jaw at a first fulcrum point, a first connecting plate having a first end hinged to the driving piston and a second end hinged to the mobile jaw through a pivotable connection at the second fulcrum seat at a second fulcrum point, so that, in response to the movement of the driving piston with respect to the housing, the mobile jaw and the fixed jaw perform a relative rotational movement about the first fulcrum point, between an open position and a closed position, in order to perform the cutting or the compression, and a second connecting plate having a first end connected to the housing and a second end connected to the fixed jaw through one of the first and second connecting seats, the fixed jaw being further directly connected to the housing through the other one of the first and second connecting seats, so that the housing, the second connecting plate and the fixed jaw form an articulated non-deformable triangle, wherein the distance between the first connecting seat and the second connecting seat of the fixed jaw is equal to the distance between the first fulcrum seat and the second fulcrum seat of the mobile jaw.

2. Cutting or compression tool according to claim 1, wherein the second end of the second connecting plate is connected to the fixed jaw through the second connecting seat at the first fulcrum point, and the fixed jaw is directly connected to the housing through the first connecting seat.

3. Cutting or compression tool according to claim 1, wherein the fixed and mobile jaws are formed in the shape of a plate oriented in a plane perpendicular to the relative rotation axis between the fixed jaw and the mobile jaw.

4. Cutting or compression tool according to claim 1, wherein the connecting seats and the fulcrum seats are circular holes suitable to receive corresponding pins or bolts.

5. Cutting or compression tool according to claim 1, wherein the fixed jaw comprises a single-piece jaw body which has an L-shape with:
  a sharp blade or profiled portion as a compression surface, formed along an edge of an upper arm of the "L", and
  a first hole formed in a lower base of the "L" close to a free end thereof which faces the same side of the blade portion or the compression surface, and
  a second hole formed in the lower base of the "L" at the joining angle between the upper arm and the lower base, opposed to the free end,
  wherein the first hole is the second connecting seat and the second hole is the first connecting seat, and
wherein the mobile jaw comprises a single-piece jaw body which has an L-shape with:
  a sharp blade or profiled portion as a compression surface, formed along an edge of an upper arm of the "L", and
  a first hole formed in a lower base of the "L" close to a free end thereof which faces the same side of the blade portion of the compression surface; and
  a second hole formed in the lower base of the "L" at the joining angle between the upper arm and the lower base, opposed to the free end,
  wherein the first hole forms the first fulcrum seat and the second hole forms the second fulcrum seat.

6. Cutting or compression tool according to claim 1, wherein, inside the second connecting seat and the first fulcrum seat, a cylindrical spacer is inserted, which has a calibrated length greater than the sum of the thicknesses of the second connecting seat and the first fulcrum seat, so as to accurately define a space which allows a relative rotational sliding between the fixed and the mobile jaws.

7. Cutting or compression tool according to claim 1, wherein both the fixed jaw and the mobile jaw include one or more fixing holes placed with respect to the sharp blade portion or the compression surface on a side opposite to the side of the first fulcrum seat, so as to allow the mounting of an anti-spreading guiding portion on one of the jaws.

8. Cutting or compression tool, comprising:
  a housing and a driving group connected to the housing and configured to move a driving piston with respect to the housing,
  a fixed jaw comprising a first connecting seat and a second connecting seat, wherein the second connecting seat is spaced from the first connecting seat and the fixed jaw is non-pivotably connected with respect to the housing through said first and second connecting seats,
  a mobile jaw comprising a first fulcrum seat and a second fulcrum seat, wherein the second fulcrum seat is spaced from the first fulcrum seat and the mobile jaw is hinged to the fixed jaw through a pivotable connection between the first fulcrum seat of the mobile jaw and the second connection seat of the fixed jaw at a first fulcrum point,
  a first connecting plate having a first end hinged to the driving piston and a second end hinged to the mobile jaw through the second fulcrum seat at a second fulcrum point,
  a second connecting plate having a first end pivoted to the housing and a second end pivoted to the fixed jaw through one of the first and second connecting seats and wherein the second connection plate is connected to the fixed jaw only at the second connection seat,
  wherein the fixed jaw is directly connected to the housing through the connecting seats, so that the housing, the second connecting plate and the fixed jaw form an articulated non-deformable triangle,
  wherein the movement of the driving piston with respect to the housing brings about a relative rotational movement of the mobile and fixed jaws about the first fulcrum point.

\* \* \* \* \*